United States Patent [19]

Stoner et al.

[11] 4,176,693
[45] Dec. 4, 1979

[54] APPARATUS AND METHOD OF OPERATING

[75] Inventors: Jesse A. Stoner, Scotia, N.Y.; Robert L. Mills, Fort Wayne, Ind.

[73] Assignee: General Electric Company, Fort Wayne, Ind.

[21] Appl. No.: 883,582

[22] Filed: Mar. 6, 1978

[51] Int. Cl.² .................. B65B 3/04; B22D 41/00
[52] U.S. Cl. .................. 141/1; 73/DIG. 9; 141/82; 141/232; 141/242; 141/284; 164/335; 222/629
[58] Field of Search .................. 141/1, 2, 82, 98, 110, 141/232, 234, 284, 387, 392, 242; 164/136, 335, 336; 222/595, 629; 73/DIG. 9, 425.4 R

[56] References Cited

U.S. PATENT DOCUMENTS 3,181,212 5/1965 Madwed .................. 164/336 X

Primary Examiner—Frederick R. Schmidt
Attorney, Agent, or Firm—Joseph E. Papin

[57] ABSTRACT

An apparatus has means for containing a level of flowable hardenable material therein, and means is selectively operable for carrying a predetermined amount of the hardenable material from the level thereof in the containing means to a preselected position beyond the level of the remaining hardenable material in the containing means. Means is associated with the carrying means in its preselected position for extracting therefrom another amount of the hardenable material predeterminately less than the predetermined amount.

A method of operating the apparatus is also disclosed.

58 Claims, 8 Drawing Figures

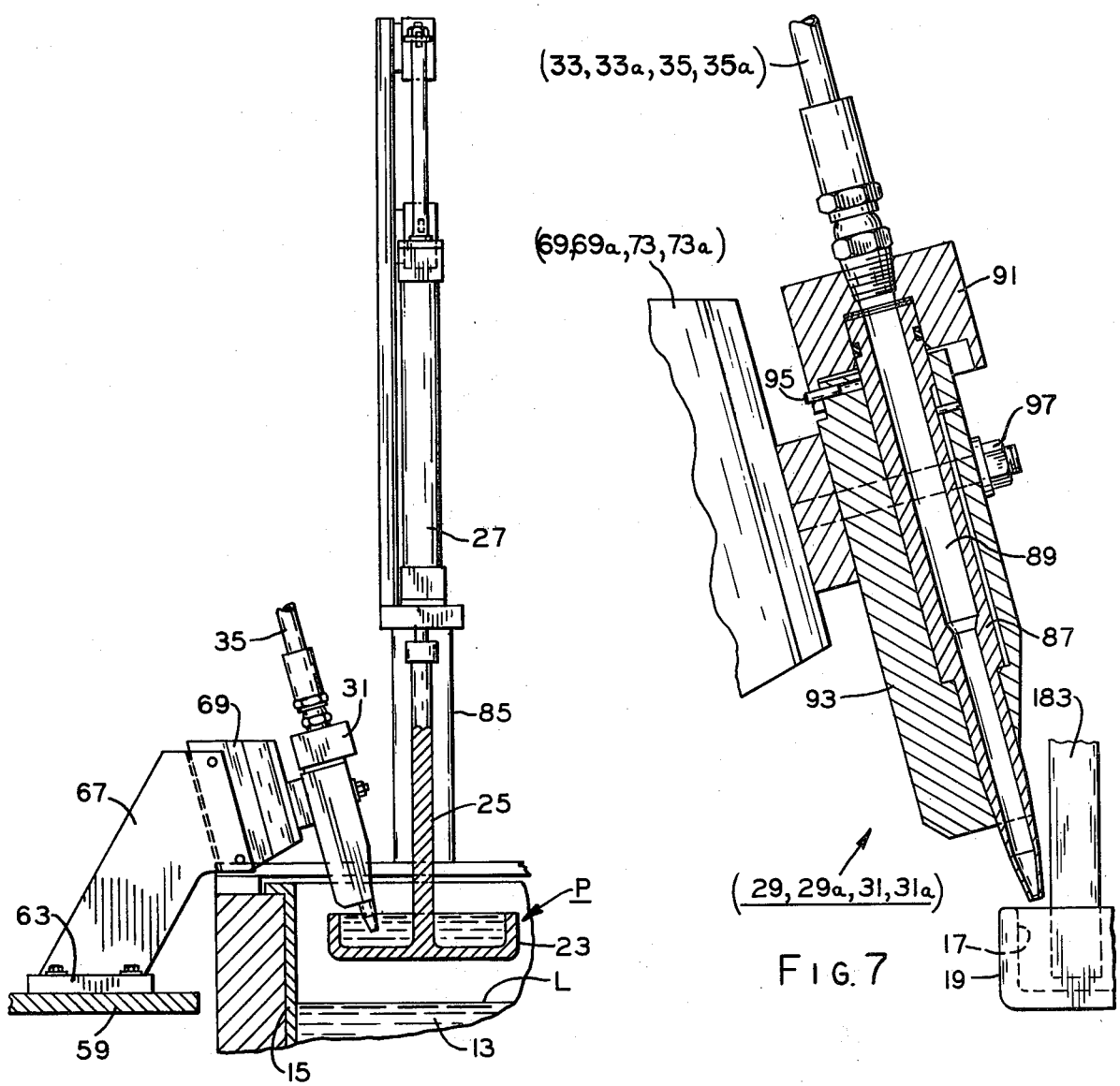
FIG. 6
FIG. 7
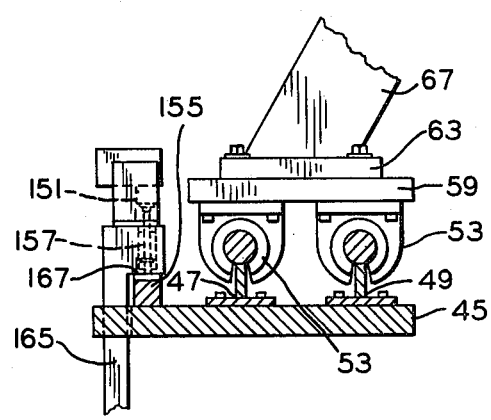
FIG. 8

APPARATUS AND METHOD OF OPERATING

FIELD OF THE INVENTION

This invention relates in general to assembly apparatus and methods and in particular to such apparatus and methods which may be utilized in the assembly of prime movers.

BACKGROUND OF THE INVENTION

In the past, various apparatus and methods have been utilized for assembling components of a prime mover, such as a dynamoelectric machine or electric motor for instance. Of course, in the manufacture of a prime mover, it is necessary that a rotatable assembly thereof, such as a rotor and shaft for instance, be properly aligned both radially and axially with a cooperating stationary assembly, such as a stator for instance, of the prime mover. If radially misaligned, an eccentric air gap between the rotatable and stationary assemblies may result thereby to effect a nonuniform flux path with poor electrical efficiencies and the mechanical deficiency of vibration. If axially misaligned, an undesirably great amount of axial thrust with respect to the rotatable assembly may be produced in the prime mover. One apparatus and method of assembling components of a dynamoelectric machine is illustrated in the following patents, all of which are incorporated herein by reference: U.S. Pat. No. 3,857,170 issued Dec. 31, 1974; U.S. Pat. No. 3,974,873 issued Aug. 17, 1976; U.S. Pat. No. 3,974,032 issued Sept. 7, 1976; and U.S. Pat. No. 4,004,725 issued Jan. 25, 1977. These patents also disclose apparatus and and methods for assembling or attaching a component, such as a beam or the like, carried on the stationary assembly to another component, such as an end plate or the like, in which the rotatable assembly is suitably journaled.

SUMMARY OF THE INVENTION

Among the several objects of the present invention may be noted the provision of an improved apparatus, such as those utilized in the manufacture of prime movers for instance and improved methods of operating such apparatus which are believed to overcome at least some of the disadvantageous and undesirable features of the prior art; the provision of such improved apparatus and method in which a flowable hardenable material in a source thereof is selectively provided at a preselected position or level with respect to the remaining hardenable material irrespective of the level thereof in the source; the provision of such improved apparatus and methods which effect improved delivery of the hardenable material from the source to the prime mover for assembling it; the provision of such improved apparatus and methods in which the hardenable material is extracted from means associated with the source for carrying a part of the molten hardenable material therefrom to the aforementioned preselected position; the provision of such improved apparatus and methods in which means for delivering the hardenable material from the source thereof to the prime mover are respectively moved through different paths; the provision of such improved apparatus and methods utilizing simplified adjustments to accommodate prime movers of different lengths; and the provision of such improved apparatus and method in which the component parts utilized are simplified in design, economically manufactured and easily assembled. These as well as other objects and advantageous features of the present invention will be in part apparent and in part pointed out hereinafter.

In general, apparatus in one form of the invention has means for containing a level of flowable hardenable material therein, and means is operable for only carrying a part of the hardenable material at least from the level thereof in the containing means to a preselected position beyond the level of the remaining hardenable material in the containing means so that the entire hardenable material part is contained in the carrying means when it is in its preselected position. Means is associated with the hardenable material part contained in the carrying means when it is in its preselected position for extracting at least some of the hardenable material from the entire part thereof contained in the carrying means.

Also in general and in one form of the invention, an apparatus is provided for delivering a flowable hardenable material from means for containing it to a pair of means for receiving it in a component of a prime mover associated in a predetermined assembly position with respect to the apparatus. A pair of means is operable generally for delivering the hardenable material from the containing means to the receiving means pair. Means is provided for conjointly moving the delivering means pair from one position adjacent the containing means toward another position adjacent the prime mover, respectively, and the conjointly moving means includes means associated with one of the delivering means for effecting movement thereof with respect to the other of the delivering means at least in part through a different path between the respective one and another positions thereof.

Further in general, an apparatus is provided for delivering a flowable hardenable material to at least one means for containing it in a component of a prime mover associated in a predetermined assembly position with respect to the apparatus. Means is provided for containing a level of the hardenable material therein, and means is associated with the containing means and movable with respect thereto for carrying a portion of the hardenable material from its level to a preselected location generally beyond the level of the hardenable material remaining in the containing means. Means is operable generally in one position thereof for extracting hardenable material from the carrying means when it is in its preselected location and movable from the one position toward another position at least closely adjacent the at least one receiving means of the prime mover for expelling the extracted hardenable material into the at least one receiving means. Means is provided for selectively effecting the movement of the extracting and expelling means between the one position and the another position thereof.

In general and in one form of the invention, a method is provided for operating an apparatus adapted for delivering a flowable hardenable material from a source thereof to means for receiving it in a component of a prime mover associated in a predetermined assembly position with respect to the apparatus. In this method, a means for carrying a part of the hardenable material from the source is displaced to a preselected location with respect thereto, and the hardenable material part is retained in the carrying means when it is in its preselected location. Another part of the hardenable material is extracted from the first named hardenable material part retained in the carrying means when it is in the preselected location thereof.

Also in general and in one form of the invention, a method is provided for operating an apparatus having a pair of means for delivering a flowable hardenable material from means for containing the hardenable material to a pair of means in a component of a prime mover for receiving the hardenable material and the prime mover being associated in a predetermined assembly relation with respect to the apparatus. In this method, the delivering means pair is conjointly moved from one position at least adjacent the containing means to another position adjacent the receiving means pair of the prime mover, respectively, and one of the delivering means is displaced with respect to the other of the delivering means through a different path between the respective one and another positions thereof during the conjoint movement of the delivering means pair.

BRIEF DESCRIPTION OF THE DRAWINGS

FIG. 6 is a partial sectional view taken along line 6—6 of FIG. 1 illustrating another syringe means of the apparatus immersed in the ladle in its preselected position;

FIG. 7 is a greatly enlarged sectional view showing one of the syringes of FIG. 1 in cross-section.

FIG. 8 is a sectional view taken along line 8—8 in FIG. 2.

Corresponding reference characters indicate corresponding parts throughout the several views of the drawings.

The exemplifications set out herein illustrate the preferred embodiments of the invention in one form thereof, and such exemplifications are not to be construed as limiting the scope or the disclosure of the invention in any manner.

DETAILED DESCRIPTION OF THE PREFERRED EMBODIMENTS

Figure 1:
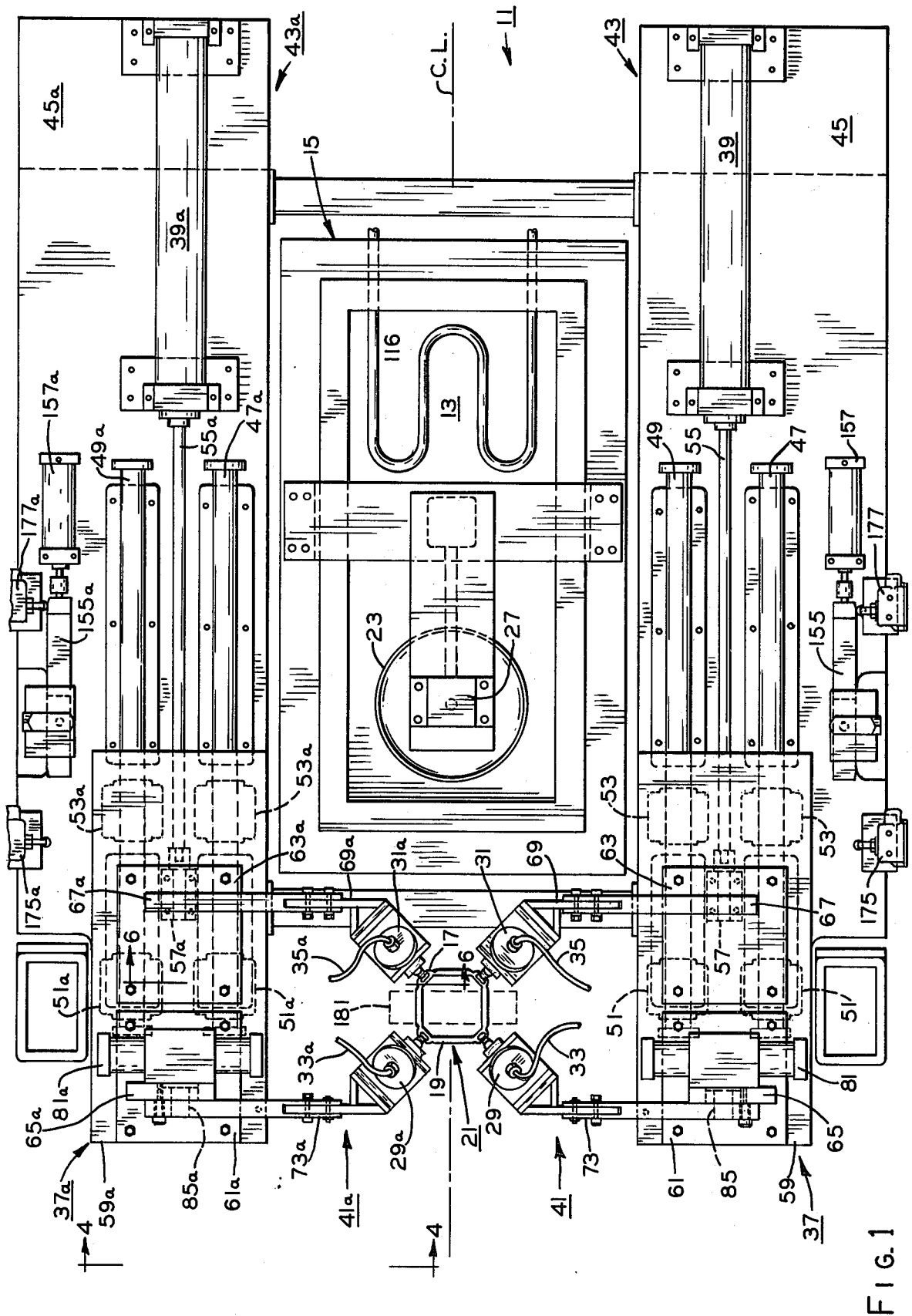
FIG. 1 is a plan view showing an apparatus in one form of the invention and illustrating principles which may be utilized in a method of operating the apparatus also in one form of the invention.

Referring now to the drawings in general, there is shown a method of operating an apparatus 11 adapted for delivering a flowable hardenable material 13 from means, such as a source or well 15, for containing the hardenable material to means, such as a plurality of sockets 17 or the like, for receiving the hardenable material in a component 19 of a prime mover 21 associated in a predetermined assembly position with the apparatus (FIG. 1). In this method, a part or predetermined amount of the hardenable material in containing means or well 15 is displaced or otherwise carried with respect thereto to a preselected position or location P, and another part or predetermined amount of the hardenable material is extracted from the first named hardenable material part in the preselected location thereof (FIGS. 4-6).

Figures 4, 5:
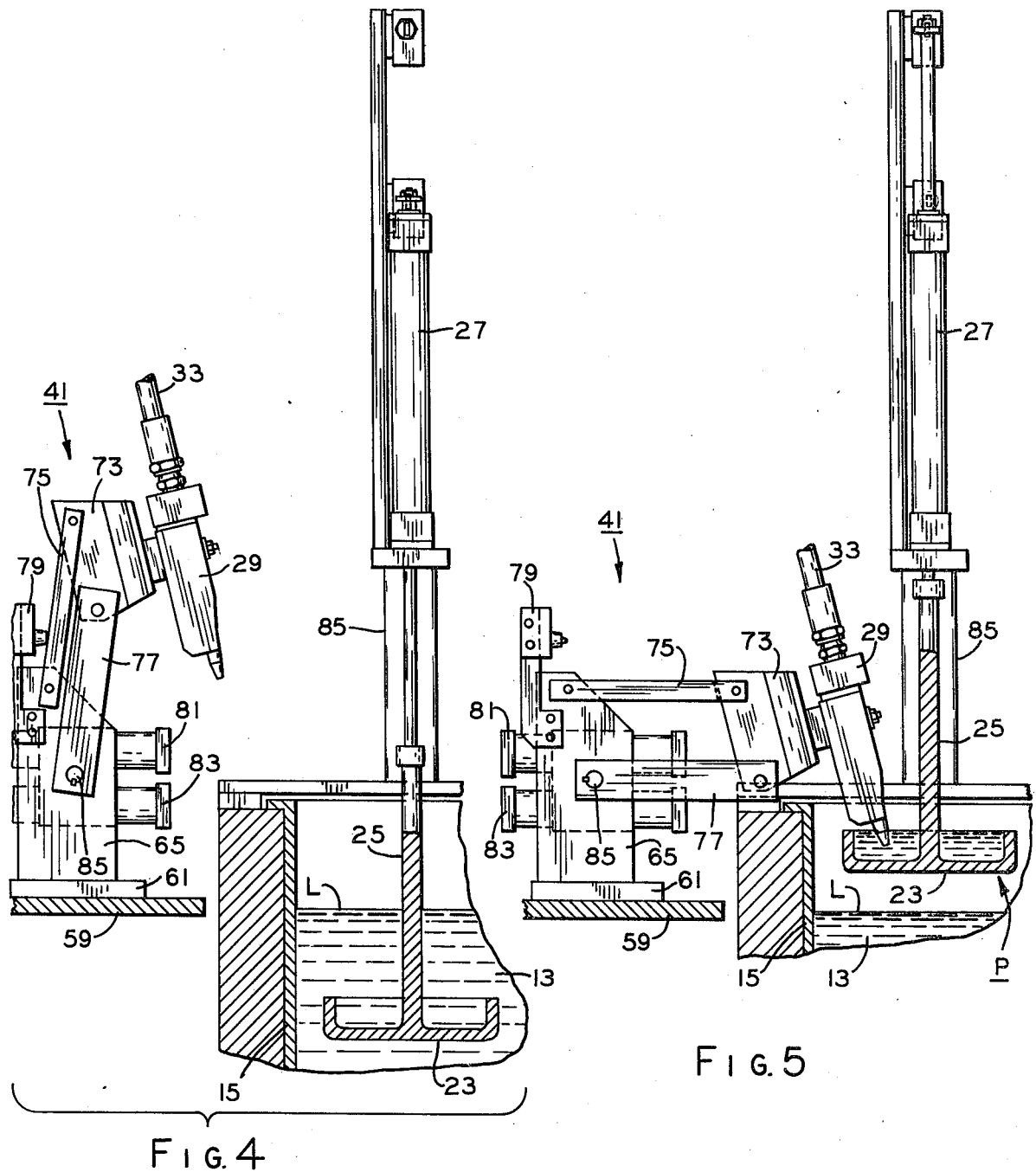
FIG. 4 is a partial sectional view taken along line 4—4 of FIG. 1 illustrating a syringe means of the apparatus in a pivotally retracted position thereof and a ladle of the apparatus immersed in the flowable hardenable material of a means for containing it.
FIG. 5 illustrates the syringe means of FIG. 4 in its pivotally displaced position associated with the hardenable material in the ladle of FIG. 3 disposed in its preselected position.

More particularly and with specific reference to FIGS. 1 and 4-6, a zinc alloy may be utilized as the flowable hardenable material in one form of the invention, but it is contemplated that other flowable hardenable materials, such other metals, metal alloy or resins or the like for instance, also may be employed so as to meet the objects and advantages of the invention in one form thereof. Means for carrying or otherwise displacing hardenable material 13 from well 15 comprises a ladle or container 23 having rod 25 associated therewith which is connected by suitable means (not shown) with means, such as a double-acting air cylinder 27 or otherwise the like for instance, for reciprocally operating, moving or actuating the ladle generally between one position thereof immersed into the level L of the hardenable material 13 in the well, as shown in FIG. 4, so as to capture in the ladle the aforementioned preselected amount of the hardenable material and another position, such as the preselected location P of the ladle (as best seen in FIGS. 5 and 6), disposed generally beyond the level L of the remaining hardenable material in the well with the ladle having the captured hardenable material contained therein. Air cylinder 27 may be mounted to a superstructure 28 of apparatus 11 disposed over well 15 and mounted by suitable means to the well. A plurality of extracting, delivering or extracting and expelling means, such as for instance syringes 29, 29a, 31, 31a, are associated or communicated with the captured hardenable material in ladle 23 when the ladle is in the preselected location P thereof, and the syringes are selectively operable to extract a predetermined amount of the hardenable material from the ladle, respectively, as discussed in detail hereinafter.

As shown particularly in FIG. 1, apparatus 11 is generally symmetrical about the centerline thereof, indicated as CL in FIG. 1, which extends generally centrally through well 15, ladle 23 and prime mover 21 in its assembly position with respect to apparatus 11; thus, like component parts of apparatus 11 on opposite sides of centerline CL are respectively designated by a reference numeral and such reference numeral followed by the letter "a", even in the event one of such like components may be omitted for the sake of drawing simplicity and/or clarity. A plurality of conduits 33, 33a, 35, 35a are respectively connected to syringes 29, 29a, 31, 31a and the conduits may be selectively subjected to a source of vacuum (not shown) thereby to effect the extraction of the hardenable material by the syringes and also a source of fluid pressure (not shown) thereby to effect the expulsion of the extracted hardenable material from the syringes into sockets 17 in component 19 which may comprise an end plate or the like of prime mover 21, as discussed hereinafter.

Syringes 29, 29a, 31, 31a are mounted in predetermined spaced apart relation on a pair of carriers 37, 37a which are reciprocally movable or slidable for conjointly moving, displacing or otherwise translating the syringes between a pair of predetermined or preselected positions, such as respective retractile or retracted positions generally adjacent well 15 so as to be associated with ladle 23, as previously discussed, and respective protractile or protracted positions generally adjacent prime mover 21 so as to be associated with sockets 17 thereof, as best seen in FIG. 1. When syringes 29, 29a, 31, 31a are so displaced by carriers 37, 37a to the respective protracted positions so as to associate the syringes with sockets 17 of prime mover 21, the syringes may be selectively operated to effect the expulsion therefrom of the extracted hardenable material into the sockets by selectively connecting or communicating the syringes through conduits 33, 33a, 35, 35a with the source of fluid pressure (not shown), as previously mentioned.

In one form of the invention, it is contemplated that syringes 29, 29a, 31, 31a may be rigidly secured to carriers 37, 37a so as to be generally immovable with respect thereto during the aforementioned conjoint movement of the syringes with the carriers between the aforementioned retracted and protracted positions thereof so as to meet the objects and advantages of the invention. However, referring again in general to the drawings and recapitulating at least in part with respect to the foregoing, another method of operating apparatus 11 includes conjointly moving syringes 29, 29a, 31, 31a from the respective retracted positions thereof adjacent well 15 to the respective protracted positions thereof adjacent prime mover 21 and displacing syringes 31, 31a with respect to syringes 29, 29a at least in part through a different path between such retracted and protracted positions during the conjoint movement of the syringes (FIGS. 1 and 4-6).

More particularly and with specific reference to FIGS. 1 and 4-6, it may be noted that syringes 29, 29a, 31, 31a have generally like attitudes or are similarly oriented when the syringes are disposed in their respective retracted positions associated with ladle 23 (as best seen in FIGS. 5 and 6) and in their respective protracted positions associated with sockets 17 of prime mover 19 (as best seen in FIG. 1). However, subsequent to the extraction of the hardenable material from ladle 23 into syringes 29, 29a, 31, 31a, as previously discussed, syringes 31, 31a are rotated, moved or otherwise displaced pivotally from a predetermined or preselected generally at-rest position (as best seen in FIG. 5) with respect to carriers 37, 37a and syringes 29, 29a into a predetermined or preselected pivotally displaced position (as best seen in FIG. 4). In this pivotally displaced position, it is apparent that the attitudes or orientations of syringes 31, 31a are different than those of syringes 29, 29a which are, as previously mentioned, generally immobile with respect to carriers 37, 37a. Thus, upon the translatory movement of syringes 29, 29a, 31, 31a with carriers 37, 37a between the retracted and protracted positions thereof, syringes 31, 31a remain in their pivotally displaced positions and are subsequently pivotally returned to their at-rest positions adjacent sockets 17 of prime mover 21 (as best seen in FIG. 1). In this manner, it may be noted that the movement of syringes 31, 31a relative to or with respect to syringes 29, 29a upon the conjoint movement of the syringes with carriers 37, 37a defines a path for syringes 31, 31a different than that through which syringes 29, 29a are movable between the aforementioned retracted and protracted positions. This particular movement of syringes 31, 31a through a path different than syringes 29, 29a may be necessitated to avoid interferring and deleterious engagement with parts of prime mover 21 in its predetermined assembly position with respect to apparatus 11. Even though syringes 31, 31a are described above as being movable through a path different than that of syringes 29, 29a, it is contemplated that all of the syringes may be moved through the same or similar paths in one form of the invention so as to meet the objects and advantages thereof.

In addition to the foregoing, it may be noted that ladle 23 with the captured hardenable material therein is selectively actuated by its air cylinder 27 to the preselected location P, and syringes 29, 29a, 31, 31a are adapted to be subsequently lowered into the communication with the captured hardenable material in the ladle, as described hereinafter in detail; however, as an alternative, it is contemplated that the ladle may be actuated to the preselected location P in order to raise the captured hardenable material in the ladle into the communication with the syringes when they are disposed along with carriers 37, 37a in the retracted position thereof adjacent well 15 within the scope of the invention so as to meet at least some of the objects and advantageous features thereof.

Referring again in general to the drawings and recapitulating at least in part with respect to the foregoing, apparatus 11 in one form of the invention comprises well 15 having level L of the hardenable material 13 therein, and ladle 23 is selectively operable for carrying a predetermined amount of the hardenable material from level L thereof in the well to the preselected location P of the ladle beyond the level of the remaining hardenable material in the well (FIGS. 4-6). Syringes 29, 29a, 31, 31a, or any one or combination thereof, may be associated with ladle 23 in its preselected location P for extracting therefrom another amount of the hardenable material predeterminately less than the predetermined amount (FIGS. 3 and 4). Further and also in one form of the invention, a pair of means, such as double acting air cylinders or motors 39, 39a or the like, is provided for selectively effecting the movement or displacement of carriers 37, 37a with syringes 29, 29a, 31, 31a thereon between the respective retracted positions thereof adjacent well 15 and the respective protracted positions thereof adjacent prime mover 21, and of course, the movement effecting means or air cylinders 39, 39a also define means for selectively returning the carriers from such protracted positions to such retracted positions (FIGS. 1 and 2).

Still further and in one form of the invention, apparatus 11 also includes means, such as a pair of crank devices or arm means 41, 41a, conjointly movable with the carriers or displacement means 37, 37a and operable generally for pivotal movement with respect thereto from the respective at-rest positions to the respective pivotally displaced positions thereof when the carriers are in the respective retracted and protracted positions thereof, (FIGS. 1, 4 and 5). Syringes 31, 31a are conjointly movable with the pivotal movement means or arm means 41, 41a to the respective at-rest positions thereof for extracting hardenable material from ladle 23 when carriers 37, 37a are in their respective retracted positions and for expelling the extracted hardenable material into sockets 17 adapted for association therewith when the carriers are in their respective protracted positions (FIGS. 1, 4 and 5).

Figure 2:
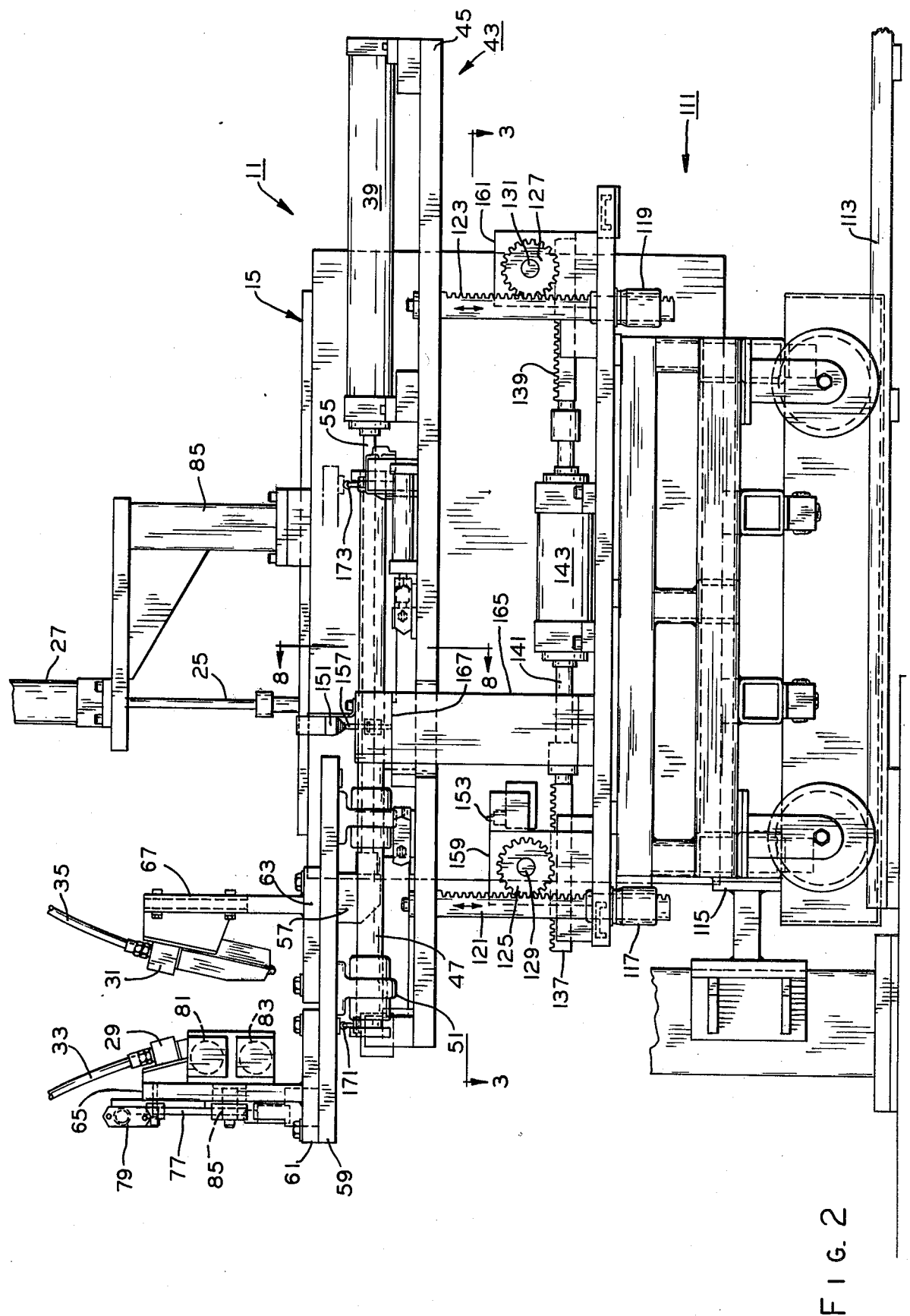
FIG. 2 is a side elevational view of the apparatus of FIG. 1.
Figure 3:
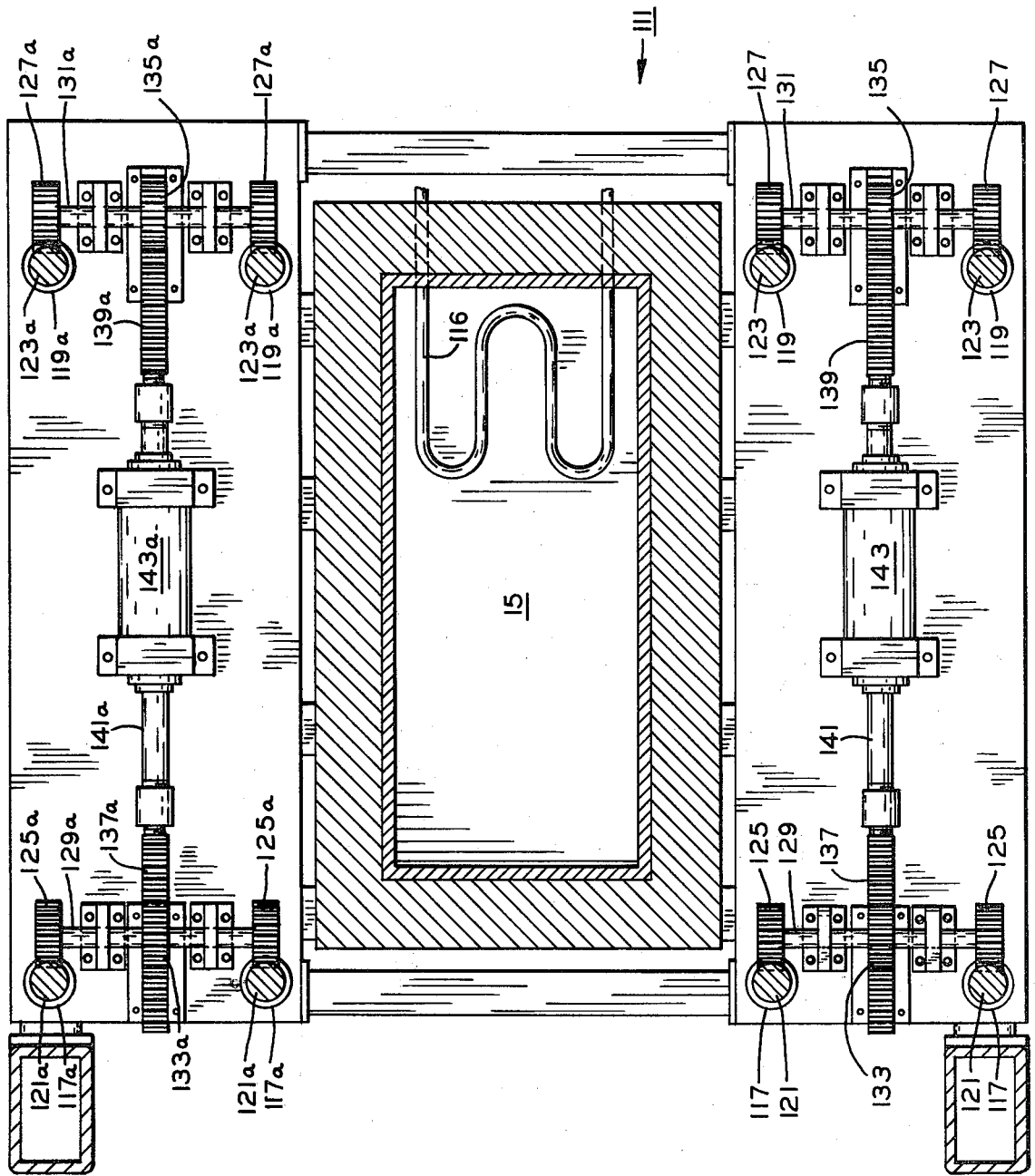
FIG. 3 is a sectional view taken along line 3—3 in FIG. 2.

More particularly and with specific reference to FIGS. 1 and 2, apparatus 11 has a pair of slide mechanisms or devices, indicated generally at 43, 43a, which are adjacently arranged on opposite sides of well 15 and prime mover 21 in its assembly position with respect to the apparatus so as to extend at least between the well and the prime mover, and the slide mechanisms are adapted to be reciprocally movable in a verticle direction, as indicated by the double-end directional arrows in FIG. 2 and as discussed in detail hereinafter. Slide mechanisms 43, 43a respectively include a pair of generally elongate plates or bases 45, 45a which, as mentioned above, are oppositely disposed adjacent well 15 and prime mover 21 so as to extend at least therebetween when the prime mover is in its assembly position with respect to apparatus 11. Pairs of stationary guide or slide means, such as rods 47, 49 and 47a, 49a are mounted by suitable means to plates 45, 45a adjacent the upper sides or faces thereof, and a pair of sets of bushings or split slide blocks 51, 53 and 51a, 53a are slidably received on guide rods 47, 49 and 47a, 49a and fixedly attached by suitable means to carriers 37, 37a, respectively. Air cylinders 39, 39a are fixedly attached by suitable means to plates 45, 45a adjacent the rightward end thereof (as seen in FIG. 1), and the air cylinders include a pair of drive or piston rods 55, 55a which are drivingly connected with a pair of depending flanges 57, 57a of carriers 37, 37a. Thus, it may be seen that piston rods 55, 55a are actuated upon the selective conjoint operation or actuation of air cylinders 39, 39a to reciprocally slide carriers 37, 37a on guide rods 47, 49 and 47a, 49a between the respective retracted positions of the carriers adjacent well 15 and the respective protracted positions thereof adjacent prime mover 15. Further, air cylinders 39, 39a are of the type well known to the art in which the stroke thereof may be predeterminately adjusted so as to define the aforementioned respective retracted positions and respective protracted positions of the carriers.

Carriers 37, 37a include a pair of generally elongate carrying plates 59, 59a which are fixedly attached by suitable means to bushing sets 51, 53 and 51a, 53a slidable on guide rods 47, 49 and 47a, 49a, respectively, and depending flanges 57, 57a of the carriers are fixedly attached by suitable means to the lower sides or faces of carrying plates 59, 59a so as to be drivenly connected with piston rods 55, 55a of air cylinders 39, 39a, respectively, as previously mentioned and as best seen in FIG. 2. Pairs of syringe mounting blocks or plates 61, 63 and 61a, 63a are fixedly attached by suitable means to the upper sides or faces of carrying plates 59, 59a, so that blocks 61, 63 are in predetermined spaced apart relation on carrying plate 59 and blocks 61a, 63a are in predetermined spaced apart relation on carrying plate 59a. Mounting blocks 61, 61a and 63, 63a have upstanding supports or support plates 65, 65a and 67, 67a attached thereto by suitable means, and a pair of syringe mounts 69, 69a for syringes 31, 31a are fixedly secured to support plates 67, 67a so as to extend therefrom. As may be best seen in FIG. 1, syringes 31, 31a are attached to their respective mounts 69, 69a so as to be predeterminately located in their respective preselected attitudes or orientations.

Syringes 29, 29a in their respective preselected attitudes or orientations are attached to another pair of syringe mounts 73, 73a, and the syringe mounts are respectively pivotally connected with pairs of links or pivoted arms 75, 77 and 75a, 77a which in turn are pivotally connected with support plates 65, 65a. Thus, links 75, 77 and 75a, 77a pivotally interconnected with syringe mounts 73, 73a constitute arm means 41, 41a which, as previously mentioned, are crank devices operable to pivotally move syringes 29, 29a carried thereby between their respective at-rest or returned positions and pivotally displaced positions (as best seen in FIGS. 4 and 5) when the syringe and carriers 37, 37a are disposed in their respective retracted and protracted positions. A pair of positive stops or abutment means 79, 79a are provided on support plates 65, 65a for motion arresting engagement or abutment with links 75, 75a when the crank devices are pivotally rotated or moved to their respective pivotally displaced positions about support plates 65, 65a. Pairs of driving devices or air cylinders 81, 83 and 81a, 83a, such as those manufactured by PHD Inc., Baer Field, Fort Wayne, Ind. under model no. R21a-6090-P-A-D, are mounted to support plates 65, 65a, and the cylinders are selectively operable to drive or rotate a pair of pivot pins 85, 85a which are suitably arranged or journaled in support plates 65, 65a and extend therethrough into pivoting operating engagement with links 77, 77a. Thus, upon the selective operation of cylinders 81, 81a and 83, 83a to effect conjoint driven rotation of pivot pins 85, 85a, these pins drive or pivot links 77, 77a in opposite directions generally about support plates 65, 65a. Of course, links 75, 75a and syringe mounts 73, 73a are conjointly actuated or pivoted with links 77, 77a upon the driven pivoted rotation thereof so as to effect the pivotal movement of syringes 29, 29a between their respective at-rest positions and pivotally displaced positions.

As shown in FIG. 7, syringes 29, 29a, 31, 31a are all of like construction each including a generally cylindric elongate nozzle 87 with a hardenable material accommodating or central passage 89 therethrough, and a pair of housings 91, 93 which are retained against displacement from each other by suitable means, such as a pin or screw 95 or the like, contain the nozzle. Syringes 29, 29a, 31, 31a are respectively mounted in their preselected attitudes or orientations to syringe mounts 71, 71a, 73, 73a by suitable means, such as for instance a plurality of studs 97 or the like, which pass through syringe housing 93, and conduits 33, 33a, 35, 35a are connected with syringe housing 91 so as to communicate with nozzle passage 89. If desired, an auxiliary heating device (not shown), may be associated with housing 93 of each syringe 29, 29a, 31, 31a to enhance the flow of the hardenable material through the nozzles 87.

Apparatus 11, as shown in FIGS. 2 and 3, is also provided with a wheeled base support or carriage, indicated generally at 111, which is movable on cooperating tracks 113 to a predeterminately located position in engagement with a locating abutment 115. Although apparatus 11 is described as having a wheeled carriage 111 merely for purposes of disclosure, it is contemplated that other supporting means, such as a stationary support for instance, may be utilized in conjunction with the apparatus within the scope of the invention so as to meet the objects thereof set forth herein. Well 15 is supported on carriage 111 so as to be disposed generally between slide mechanisms 43, 43a, and means, such as a calrod unit or other heater 116 for instance, is disposed in the well in order to heat the hardenable material therein so as to maintain it in a flowable condition. Carriage 111 is provided with pairs of bushing sets 117, 119 and 117a, 119a arranged in journaling and guiding engagement with mating pairs of vertically disposed, reciprocally movable rack sets 121, 123 and 121a, 123a, and the upper end of each of the racks is secured by suitable means in supporting engagement with the lower faces or sides of plates 45, 45a of slide mechanisms 43, 43a, respectively. Vertical racks 121, 123 and 121a, 123a are meshed with pairs of pinion sets 125, 125 and 125a, 127a which are disposed on opposite ends of shafts 129, 131 and 129a, 131a. These shafts are rotatably mounted or otherwise suitably journaled on carriage 111, and each of the shafts carry a centrally located drive gear 133, 135 and 133a, 135a which effect the conjoint rotation of the shafts and the pinions carried thereby. Drive gears 133, 135 and 133a, 135a are meshed with horizontally disposed, reciprocally movable pairs of racks 137, 139 and 137a, 139a which are attached by suitable means to the opposite ends of a pair of reciprocal piston rods 141, 141a of a pair of double ended, double acting air cylinders or motors 143, 143a. Thus, upon the selective conjoint operation or actuation of air cylinders 143, 143a, horizontal racks 137, 139 and 137a, 139a are conjointly moved thereby in order to effect the conjoint driven rotation of drive gears 133, 135 and 133a, 135a so as to conjointly rotate shafts 129, 131 and 129a, 131a which, in turn, effect the conjoint rotation of pinion sets 125, 127 and 125a, 127a to vertically move vertical rack sets 121, 123 and 121a, 123a, respectively. Of course, slide mechanisms 43, 43a which are secured to vertical rack sets 121, 123 and 121a, 123a are conjointly movable vertically therewith, as discussed in greater detail hereinafter.

The extent of the vertical reciprocal movement or stroke of slide mechanisms 43, 43a on vertical rack pairs 121, 121a, 123, 123a as driven in response to actuation of air cylinders 143, 143a, as previously mentioned, is variable and controlled by pairs of upper and lower movement limiting switches or switch means, such as microswitches 151, 153 and 151a, 153a or the like for instance, as well as a pair of adjustable means or members, such as stepped abutments or positive stops 155, 155a, shiftably mounted on plates 45, 45a of the slide mechanisms and reciprocally driven by another pair of air cylinders 157, 157a, respectively. For instance, when slide mechanisms 43, 43a are driven to the lower positions thereof in response to the driven operation of vertical rack pairs 121, 121a, 123, 123a by air cylinders 143, 143a, as previously mentioned, the lower faces or surfaces of plates 45, 45a on the slide mechanisms are conjointly moved into actuating engagement with limit switches 153, 153a to effect the switching operation thereof and also into abutting engagement with pairs of positive stops or abutments 159, 161 and 159a, 161a provided therefor on carriage 111. Limit switches 153, 153a control the actuation of air cylinders 143, 143a, and upon the actuation of these limit switches, the air cylinders are deactuated thereby to terminate the downward movement of slide mechanisms 43, 43a with plates 45, 45a thereof disposed on positive stops 159, 161 and 159a, 161a so as to positively or predeterminately determine the lower position of the slide mechanisms.

When slide mechanisms 43, 43a are raised to their upper positions thereof in response to the driven operation of vertical rack pairs 121, 121a, 123, 123a by air cylinders 143, 143a, limit switches 151, 151a are actuated by a pair of switch actuating means, such as spring loaded pins or plungers 163, 163a or the like for instance, which are slidably movable in a pair of stationary flanges 165, 165a disposed on carriage 111, and the flanges include a pair of abutments 167, 167a arranged to positively engage or stop on the stepped abutments of adjustable means 155. For instance, upon the upward movement of slide mechanisms 43, 43a to the raised or upper positions thereof when when carriers 37, 37a are in their protracted positions (as best seen in FIG. 2), pins 157, 157a are engaged by the higher stepped abutment of adjustable means 155, 155a and concertedly moved upwardly therewith into actuating engagement with limit switches 151, 151a to effect the switching operation thereof generally simultaneously with the abutting engagement with the higher stepped abutments of the positive stops on abutments 167, 167a of stationary flanges 165, 165a. Limit switches 151, 151a also control the actuation of air cylinders 143, 143a, and upon the actuation these limit switches, the air cylinders are deactuated thereby to terminate the upward movement of slide mechanisms 43, 43a with flange abutments 167, 167a disposed on the higher stepped abutments of adjusting means 155, 155a so as to positively determine the upper position of the slide mechanisms when carriers 37, 37a are in their protracted positions, respectively.

Upon the vertical upward movement of slide mechanisms 43, 43a to their upper position when carriers 37, 37a are in their retracted positions, air cylinders 157, 157a are actuated to shift adjustable means 155, 155a leftwardly (as best seen in FIG. 2) on plates 45, 45a of the slide mechanisms so as to dispose the lower stepped abutments of the adjustable means generally beneath switch actuating pins 157, 157a. In this manner, the vertical upward movement of slide mechanisms 43, 43a carries the lower stepped abutments of adjusting means 155, 155a into engagement with pins 157, 157a raising them into engagement with limit switches 151, 151a generally at the same time the lower stepped abutments of the adjusting means are moved into abutting or positively stopping engagement with abutments 167, 167a of stationary flanges 165, 165a. Since limit switches 151, 151a control the actuation of air cylinders 143, 143a, the air cylinders are deactuated upon the actuation of the limit switches by pins 157, 157a thereby to terminate the upward movement of slide mechanisms 43, 43a with flange abutments 167, 167a disposed on the lower stepped abutments of adjusting means 155, 155a so as to positively or predeterminately determine the upper position of the slide mechanisms when carriers 37, 37a are in their retracted positions, respectively. Thus, it may be noted that the upper positions of slide mechanisms 43, 43a are predeterminately different when carriers 37, 37a are in their protracted positions and their retracted positions, and this difference in such upper positions of the slide mechanisms may be varied by utilizing adjusting means other than adjusting means 155, 155a having differently stepped abutments within the scope of the invention in one form thereof so as to meet the objects of such invention. Of course, it is also contemplated that the upper positions of slide mechanisms 43, 43a may be the same when carriers 37, 37a are in their protracted positions and their retracted positions within the scope of the invention in one form thereof so as to also meet the objects of such inventions. This, of course, may be accomplished by using a common abutment surface on adjusting means 155, 155a for instance.

Means, such as pairs of limit switches 171, 173 and 171a, 173a, for predeterminately limiting the reciprocal movement of carriers 37, 37a are predeterminately located in spaced apart retention on plates 45, 45a of slide mechanisms 43, 43a. In effect, limit switches 171, 171a define the protracted position of carriers 37, 37a, and when carriers 37, 37a are driven by air cylinders 39, 39a in a leftward direction (as best seen in FIGS. 1 and 2) to their protracted positions, the carriers engage limit switch 171, 171a effecting the switching operation thereof in order to deactuate air cylinders 39, 39a so as to terminate the movement of the carriers in their protracted positions, respectively. Also, limit switches 173, 173a, in effect, define the retracted positions of carriers 37, 37a, and when the carriers are driven from their protracted positions in a rightward direction (as best seen in FIGS. 1 and 2) to their retracted positions, the carriers engage limit switches 173, 173a effecting the switching operation thereof in order to deactuate air cylinders 39, 39a so as to terminate the movement of the carriers in their retracted positions, respectively.

Other pairs of limit switches 175, 177 and 175a, 177a are also mounted in predetermined spaced apart relation on plates 45, 45a of slide mechanisms 43, 43a so as to predeterminately limit the reciprocal movement of adjustable means 155, 155a. In effect, limit switches 175, 175a and 177, 177a define the opposite operative positions of adjustable means 155, 155a so as to dispose the upper and lower abutments thereof in position for abutting or positive stopping engagement with abutments 167, 167a on stationary flanges 165, 165a when slide mechanisms 43, 43a are raised to their upper displaced positions with carriers 37, 37a in their respective protracted and retracted positions, as discussed above.

Referring now to FIGS. 1 and 2, prime mover 21 is disposed in its predetermined assembly position in means, such as fixture 181 or the like for instance, for disposing and maintaining the prime mover in such predetermined assembly position with respect to apparatus 11, and if a more detailed discussion of such fixture and the manner in which it may be operated and positioned is desired, reference may be had to the Jesse A. Stoner U.S. Pat. No. 4,004,725 issued Jan. 25, 1977 which is specifically incorporated herein by reference.

OPERATION

In the operation of apparatus 11, assume that carriers 37, 37a are disposed in their respective retracted positions adjacent well 15 so that syringes 29, 29a, 31, 31a are disposed with respect to the well for association with ladle 23 (as may be seen in FIGS. 5 and 6). With carriers 37, 37a and accompanying syringes 29, 29a, 31, 31a so disposed, air cylinder 27 may be selectively actuated to raise or lift ladle 23 from its position in well 15 beneath or immersed into level L of the hardenable material therein, as shown in FIG. 4, to its preselected location P with the ladle having the captured hardenable material therein, as shown in FIGS. 5 and 6. Of course, in its preselected location P, ladle 23 presents the captured hardenable material therein to syringes 29, 29a, 31, 31a so that the respective nozzles 87 thereof are immersed into the captured hardenable material. Thus, in effect, ladle 23 with the captured hardenable material therein defines a source of the hardenable material for syringes 29, 29a, 31, 31a.

When syringes 29, 29a, 31, 31a are immersed into the captured hardenable material in ladle 23, a preselected vacuum of a source thereof (not shown) is selectively applied or established in syringe conduits 33, 33a, 35, 35a and communicating nozzle passages 87 of the syringes in order to effect the extraction into the nozzle passages of the preselected amount of the hardenable material from the ladle, respectively. Subsequent to the extraction of the hardenable material from ladle 23 into syringes 29, 29a, 31, 31a, air cylinder 27 is reactuated to as to return or move the ladle downwardly from its preselected location P toward its original position immersed in the remaining hardenable material in well 15 beneath level L thereof (as best seen in FIGS. 4 and 5). With syringes 29, 29a, 31, 31a containing the hardenable material extracted from ladle 23, air cylinders 143, 143a are conjointly selectively actuated so as to respectively drive horizontal racks 137, 137a and 139, 139a leftwardly (as best seen in FIG. 3), and the respective meshing engagement of the horizontal racks with drive gears 133, 133a and 135, 135a effects the conjoint rotation thereof along with shafts 129, 129a and 131, 131a and their associated pinion pairs 125, 125a and 127, 127a. This rotation of the pinion pairs conjointly drives vertical rack pairs 121, 121a and 123, 123a meshed therewith in an upwardly direction, as illustrated by the directional arrows in FIG. 2, and slide mechanisms 43, 43a are conjointly movable with the vertical rack pairs until adjusting means 155, 155a engage pins 157, 157a carrying them into actuating engagement with limit switches 151, 151a to effect the switching operation thereof which deactuates air cylinders 143, 143a. Thus, upward movement of slide mechanisms 43, 43a to their upper positions is terminated upon the deactuation of air cylinders 143, 143a when adjusting means 155, 155a positively stop on abutments 167, 167a of stationary flanges 165, 165a.

With slide mechanisms 43, 43a so raised to the upper vertical position thereof and with syringes 29, 29a, 31, 31a containing or carrying the extracted hardenable material, as previously described, cylinders 81, 83 and 81a, 83a may be conjointly selectively actuated to drive or effect the conjoint rotation of pivot pins 85, 85a in support plates 65, 65a of carriers 37, 37a, and such rotation of the pivot pins conjointly drives or rotates arm means 41, 41a with syringes 29, 29a thereon from their respective at-rest positions to their respective pivotally displaced positions (as best seen in FIGS. 4 and 5) so as to engage links 75, 75a of the arm means with abutments 79, 79a therefor. However, while the rotation of arm means 41, 41a is described above for purposes of illustration as occuring subsequent to the conjoint movement of slide mechanisms 43, 43a to their respective upper vertical positions, it is contemplated that the arm means may be respectively rotated prior to or even during the aforementioned vertical movement of the slide mechanisms to their respective upper vertical positions within the scope of the invention so as to meet the objects thereof.

With arm means in their respective pivotally displaced positions, as described above and shown in FIG. 4, carriers 37, 37a are conjointly slid or driven on their guide rods 47, 49 and 47a, 49a from the respective retracted positions to the respective protracted positions thereof in response to the conjoint selective operation or actuation of air cylinders 39, 39a whose push rods 55, 55a are drivingly connected with depending flanges 57, 57a of the carriers, as may be seen in FIG. 1. However, as will be recalled, arm means 41, 41a and syringes 29, 29a associated therewith are disposed in their respective pivotally displaced positions having been moved through a path different than syringes 31, 31a upon the above described conjoint movement of syringes 29, 29a, 31, 31a with carriers 37, 37a between the respective retracted and protracted positions thereof. When carriers 37, 37a attain their protracted positions, the carriers engage and actuate limit switches 171, 171a (as best seen in FIG. 2) which, as previously mentioned, effect the deactuation of air cylinders 39, 39a thereby to terminate the movement of the carriers in their protracted positions. Thus, at this time when carriers 37, 37a are in the respective protracted positions thereof, cylinders 81, 83 and 81a, 83a are again conjointly selectively operated to to effect the conjoint rotation of pivot pins 85, 85a in order to pivot arm means 41, 41a and syringes 29, 29a associated therewith from their respective pivotally displaced position to their respective at-rest positions, as illustrated in FIGS. 4 and 5 for instance.

When carriers 37, 37a are in their respective protracted positions and subsequent to the movement of arm means 41, 41a to their respective at-rest positions, air cylinders 143, 143a are again conjointly selectively actuated so as to drive horizontal racks 137, 137a and 139, 139a rightwardly (as best seen in FIG. 3), and the respective meshing engagement of the horizontal racks with drive gears 133, 133a and 135, 135a effects the conjoint rotation thereof along with shafts 129, 129a and 131, 131a and their associated pinion pairs 125, 125a and 127, 127a. This rotation of the pinion pairs conjointly drives vertical rack pairs 121, 121a, 123, 123a meshed therewith in a downwardly direction, as illustrated by the directional arrows in FIG. 2, until the lower faces of plates 45, 45a on slide mechanisms 43, 43a engage and actuate limit switches 153, 153a and also seat on carriage stops 159, 161 and 159a, 161a thereby to prevent further conjoint actuation of air cylinders 143, 143a. Thus, the actuation of limit switches 153, 153a predeterminately defines one of the lower or vertically displaced positions of slide mechanisms 43, 43a which are, as previously mentioned, attached to vertical rack pairs 121, 123 and 121a, 123a so as to be conjointly movable therewith, respectively.

Upon the movement of slide mechanisms 43, 43a to their respective one lower vertically displaced positions, as described above, nozzles 87 of syringes 29, 29a, 31, 31a are predeterminately disposed at least closely adjacent corresponding or confronting sockets 17 in end plates 19 of prime mover 21 in its predetermined assembly position with respect to apparatus 11 (as best seen in FIG. 1). At this time, the vacuum acting through syringe conduits 33, 33a, 35, 35a to contain the extracted hardenable material in syringes 29, 29a, 31, 31a is terminated by connecting the syringe conduits to a source of fluid pressure (not shown) and the fluid pressure acts on the extracted hardenable material so as to effect the expulsion thereof from passages 89 of the syringes into sockets 17 of end plate 21 associated therewith. When so introduced or deposited in sockets 17, the hardenable material will, of course, harden so as to define or form a rigid connection between at least parts of end plate 17 and a plurality of beams 183 disposed therein, and if a more detailed discussion of such rigid connection or of the details of the prime mover is desired, reference may be made to the Charles W. Otto U.S. Pat. No. 3,844,024 issued Oct. 29, 1974 which is specifically incorporated herein by reference.

After the expulsion of the extracted hardenable material from syringes 29, 29a, 31, 31a into sockets 17 of end plates 19, air cylinders 81, 83 and 81a, 83a are again conjointly selectively actuated to rotate pivot pins 85, 85a in support plates 65, 65a of carriers 37, 37a, and such rotation of the pivot pins conjointly rotates arm means 41, 41a with syringes 29, 29a thereon from their respective at-rest positions to their respective pivotally displaced positions (as best seen in FIGS. 4 and 5) so as to re-engage links 75, 75a of the arm means with abutments 79, 79a therefor. With arm means 41, 41a returned to their pivotally displaced positions, air cylinders 143, 143a are again conjointly selectively actuated to move horizontal racks 137, 139 and 137a, 139a leftwardly (as best seen in FIG. 3) to drive gears 133, 135 and 133a, 135a meshed therewith and effect the conjoint rotation with the gears of shafts 129, 131 and 129a, 131a and pinion pairs 125, 127 and 125a, 127a thereon. This conjoint rotation of the pinion pairs drives vertical rack pairs 121, 123 and 121a, 123a meshed therewith in the upward direction, as illustrated by the directional arrow in FIG. 2, so as to conjointly move slide mechanisms 43, 43a carried on the vertical rack pairs to the respective upper displaced positions thereof. As previously described, the movement of slide mechanisms 43, 43a to their upper positions again engages adjusting means 155, 155a with pins 157, 157a carrying them into actuating engagement with limit switches 151, 151a to deactuate air cylinders 143, 143a and terminate the upward movement of the slide mechanisms with the adjusting means positively stopping on stationary flange abutments 167, 167a.

When the slide mechanisms 43, 43a are so returned to their respective upper displaced positions, air cylinders 157, 157a are actuated to return adjustable means 155, 155a leftwardly (as best seen in FIG. 1) to the leftward opposite operative position thereof in order to place the lower stepped abutment beneath pins 151, 151a, and the engagement of the adjustable means with limit switches 175, 175a effects deactuation of the air cylinders so as to maintain the adjustable means in the leftward positions thereof. Carriers 37, 37a are conjointly slid or returned on guide rods 47, 49 and 47a, 49a from the respective protracted positions thereof to the respective retracted positions there adjacent well 15 in response to the conjoint selective reactuation of air motors 39, 39a whose push rods 55, 55a are connected with depending flanges 57, 57a of the carriers. With carriers 37, 37a returned to their respective retracted positions, air cylinders 81, 83 and 81a, 83a are again conjointly selectively actuated to rotate pivot pins 85, 85a in support plates 65, 65a of the carriers so as to effect the conjoint rotation of arm means 41, 41a with syringes 29, 29a thereon from their respective pivotally displaced positions to their respective at-rest positions (as best seen in FIGS. 4 and 5). With carriers 37, 37a in their respective retracted positions and arm means 41, 41a in their respective at-rest positions, air cylinders 143, 143a are reactuated so as to drive horizontal racks 137, 137a and 139, 139a rightwardly (as best seen in FIG. 3), and the meshing engagement of the horizontal racks with drive gears 133, 133a and 135, 135a effects the conjoint rotation thereof along with shafts 129, 129a and 131, 131a and the pinion pairs 125, 125a and 127, 127a thereon. This rotation of the pinion pairs conjointly drives vertical rack pairs 121, 121a and 123, 123a meshed therewith downwardly, (as illustrated by the directional arrow in FIG. 2) so as to effect the conjoint downward movement therewith of slide mechanisms 43, 43a from their respective upper displaced positions to their lower displaced positions. As previously mentioned, the lowering movement of slide mechanisms 43, 43a to their lower positions again engages plates 45, 45a thereof with limit switches 153, 153a to deactuate air cylinders 143, 143a and terminate the downward movement of the slide mechanisms with the plates positively stopping on carriage stops 159, 159a, 161, 161a. This downward movement of slide mechanisms 43, 43a into the lower displaced positions thereof disposes carriers 37, 37a so that syringes 29, 29a, 31, 31a thereon may be subsequently associated with ladle 23 upon the movement of the ladle to its preselected location P, as previously discussed. Of course, apparatus 11 may be subsequently operated or recycled in the manner described above to effect the delivery of hardenable material from well 15 to sockets 17 in end plate 19 of prime mover 11 in its predetermined assembly position with respect to the apparatus.

While slide mechanisms 43, 43a have been described as being raised and lowered, it is contemplated that apparatus 11 may be operated with the slide mechanisms remaining in a stationary position within the scope of the invention in one form thereof so as to meet the objects set out hereinabove. In this alternate construction, the preselected location P of ladle 23 would, of course be elevated above well 15 so that syringes 29, 29a, 31, 31a would clear the well upon the movement of carriers 37, 37a between the respective retracted and protracted positions thereof assuming, of course, that the syringes would also clear prime mover 11 during such movement of the carriers. Along with this alternative construction, it is also contemplated that syringes 29, 29a may be mounted to carriers 37, 37a in the same manner as syringes 31, 31a so as to be immobile with respect thereto in one form of the invention so as to meet the objects set out hereinabove. Further, while the particular pivotal displacement movement of arm means 41, 41a and syringes 29, 29a between the respective at-rest and pivotally displaced positions thereof has been described above for purposes of illustration, it is also contemplated that other displacement movements may be imparted to syringes 29, 29a in one form of the invention so as to meet the objects set out hereinbefore.

From the foregoing, it is apparent that a novel apparatus 11 and novel methods of operating an apparatus have been presented meeting the objects and advantages set out herein, as well as others, and it is contemplated that changes as to the precise arrangements, shapes, details and connections of the components of such apparatus, as well as the steps of such methods, may be made by those having ordinary skill in the art without departing from the spirit of the invention or the scope thereof as defined by the claims which follow.

What we claim as new and desire to secure by Letters Patent of the United States are:

1. Apparatus for delivering a flowable hardenable material to at least a pair of means for receiving it in a component of a prime mover associated in a predetermined assembly position with respect to the apparatus, the apparatus comprising:

means arranged for containing a level of the hardenable material therein;

a ladle movable with respect to said containing means between a position generally immersed into the level of the hardenable material in said containing means so as to capture in said ladle a portion of the hardenable material and a preselected location generally beyond the level of the remaining hardenable material in said containing means with the ladle having therein the captured hardenable material portion;

means for selectively actuating said ladle to effect the movement thereof between its generally immersed position and its preselected location;

at least one reciprocally movable slide mechanism arranged on the apparatus generally adjacent said containing means and the prime mover in the predetermined assembly position thereof with respect to the apparatus, said at least one slide mechanism including a base plate, guide means on said base plate, a carrier reciprocally movable on said guide means with respect to said base plate between a pair of opposite positions generally adjacent said containing means and the prime mover in its predetermined assembly position, respectively, first driving means operable generally for selectively effecting the reciprocal movement of said carrier on said guide means between one of the opposite positions and the other of the opposite positions of said carrier, arm means mounted on said carrier so as to be conjointly reciprocally movable with said carrier between the opposite positions thereof and also pivotally movable with respect to said carrier between a generally at-rest position thereon and a pivotally displaced position when said carrier is in the one opposite position and the other opposite position thereof, respectively, a first syringe associated with said arm means and conjointly movable therewith, a first nozzle on said first syringe, a second syringe mounted to said carrier so as to be conjointly movable with said carrier between the opposite positions thereof and predeterminately spaced on said carrier from said first syringe, a second nozzle on said second syringe, and second driving means on said carrier for selectively effecting the reciprocal pivotal movement of said arm means between its at-rest position and its pivotally displaced position when said carrier is in the one opposite position and the other opposite position thereof, respectively;

third driving means associated with said at least one slide mechanism for selectively effecting the reciprocal movement thereof in one of a pair of opposite directions upon the pivotal movement of said arm means toward its at-rest position so that said first nozzle of said first syringe and said second nozzle of said second syringe are predeterminately disposed in immersed relation with respect to the captured hardenable material in said ladle in the preselected position thereof when said carrier is in its one opposite position and so that said first nozzle of said first syringe and said second nozzle of said second syringe are predeterminately disposed at least closely adjacent the at least pair of receiving means of the prime mover when said carrier is in its other opposite position, respectively; and means associated with said first and second syringes for effecting extraction of the captured hardenable material from said ladle into said syringe when said first and second nozzles of said first and second syringes are predeterminately disposed in immersed relation with respect to the captured hardenable material in said ladle and for effecting expulsion of the extracted hardenable material from said first and second syringes into the at least pair of receiving means of the prime mover when said first and second nozzles of said first and second syringes are predeterminately disposed at least closely adjacent the at least pair of receiving means, respectively.

2. An apparatus for delivering a flowable hardenable material to at least one means for containing it in a component of a prime mover associated in a predetermined assembly position with respect to the apparatus, the apparatus comprising:

means for containing a level of the hardenable material therein;

means associated with said containing means and movable with respect thereto for carrying a portion of the hardenable material from its level to a preselected location generally beyond the level of the hardenable material remaining in said containing means;

means operable generally in one position thereof for extracting hardenable material from said carrying means when it is in its preselected location and movable from the one position toward another position at least closely adjacent the at least one receiving means of the prime mover for expelling the extracted hardenable material into the at least one receiving means; and means for selectively effecting the movement of said extracting and expelling means between the one position and the another position thereof.

3. The apparatus as set forth in claim 2 further comprising means for selectively effecting the movement of said carrying means to the preselected position thereof.

4. The apparatus as set forth in claim 2 further comprising means for selectively returning said carrying means from the preselected position thereof to another preselected position generally immersed in the level of the hardenable material remaining in said containing means so as to capture in said carrying means another portion of the hardenable material.

5. The apparatus as set forth in claim 2 further comprising means associated with said containing means for heating the hardenable material therein.

6. The apparatus as set forth in claim 2 further comprising means associated with said extracting and expelling means for selectively effecting the extraction thereinto of the hardenable material from said carrying means and for selectively effecting the expulsion of the extracted hardenable material from said extracting and expelling means into the at least one receiving means.

7. Apparatus for delivering a flowable hardenable material to at least one means for receiving it in a component of a prime mover adapted to be associated in a predetermined assembly position with respect to the apparatus, the apparatus comprising:

a source of the hardenable material;

means movable for displacement between one position generally adjacent said source and another position generally adjacent the prime mover when it is in the predetermined assembly position thereof;

means conjointly movable with said displacement means and operable generally for pivotal movement with respect thereto between an at-rest position to a pivotally displaced position when said displacement means is in the one position and the another position thereof, respectively; and means conjointly movable with said pivotal movement means from the pivotally displaced position to the at-rest position thereof for extracting hardenable material from said source when said displacement means is in the one position thereof and for expelling the extracted hardenable material into the at least one receiving means of the prime mover when said displacement means is in the another position thereof, respectively.

8. The apparatus as set forth in claim 7 further comprising means for selectively driving said displacement means between the one position and the another position thereof.

9. The apparatus as set forth in claim 7 further comprising means for selectively driving said pivotal movement means between the at-rest position and the pivotally displaced position thereof.

10. The apparatus as set forth in claim 7 further comprising means associated with said extracting and expelling means and selectively operable for effecting the extraction into said extracting and expelling means of the hardenable material and the expulsion of the extracted hardenable material from said extracting and expelling means.

11. The apparatus as set forth in claim 7 further comprising means for moving said source to a preselected position so as to present the hardenable material therein to said extracting and expelling means upon the pivotal movement of said extracting and expelling means to its at-rest position when said displacement means is in the one position thereof.

12. The apparatus as set forth in claim 7 further comprising means arranged in supporting engagement with said displacement means and operable generally for moving said displacement means in one of a pair of opposite directions only when said displacement means is in the one position and the another position thereof and said extracting means is in its at-rest position so as to predeterminately dispose said extracting and expelling means with respect to said source and the at least one receiving means of the prime mover, respectively.

13. An apparatus comprising means for containing a level of flowable hardenable material therein, means operable for only carrying a part of the hardenable material at least from the level thereof in said containing means to a preselected position beyond the level of the remaining hardenable material in said containing means so that the entire hardenable material part is contained in said carrying means when it is in its preselected position, and means associated with the entire hardenable material part contained in said carrying means when it is in its preselected position for extracting at least some of the hardenable material from the entire part thereof contained in said carrying means.

14. The apparatus as set forth in claim 13 further comprising means associated with said extracting means for effecting the extraction of the at least some hardenable material from said carrying means into said extracting means when the carrying means is in its preselected position.

15. The apparatus as set forth in claim 13 further comprising means for displacing said extraction means with the at least some hardenable material therein toward another preselected position remote from said containing means and said carrying means.

16. The apparatus as set forth in claim 15 further comprising means associated with said extracting means for effecting the expulsion therefrom of the at least some hardenable material when said extracting means is in the another preselected position thereof.

17. The apparatus as set forth in claim 16 further comprising means for actuating said extracting means in its another preselected position from one attitude thereof to another different attitude in which the at least some hardenable material is expelled from said extracting means.

18. The apparatus as set forth in claim 13 further comprising means for actuating said extraction means from one attitude thereof to another different attitude so as to effect the association of said extraction means with the entire hardenable material part contained in said carrying means when it is in its preselected position.

19. The apparatus as set forth in claim 13 further comprising means for selectively actuating said carrying means to the preselected position thereof.

20. The apparatus as set forth in claim 13 wherein said carrying means comprises a ladle movable with respect to said containing means from a position at least in part immersed into the level of the hardenable material in said containing means so as to capture in said ladle the hardenable material part toward the preselected position with the ladle containing the captured hardenable material part therein.

21. In an apparatus for delivering a flowable hardenable material from means for containing it to a pair of means for receiving it in a component of a prime mover associated in a predetermined position with respect to the apparatus, and a pair of means operable generally for delivering the hardenable material from the containing means to the receiving means pair, respectively; the improvement comprising means for conjointly moving the delivering means pair from one position adjacent the containing means toward another position adjacent the prime mover, respectively, and including means associated with one of the delivering means for effecting movement thereof with respect to the other of the delivering means at least in part through a different path between the respective one and another positions thereof.

22. The apparatus as set forth in claim 21 further comprising means associated with the delivering means and operable for effecting the expulsion therefrom of the hardenable material into the receiving means of the prime mover when said delivering means are in the respective another positions thereof, respectively.

23. The apparatus as set forth in claim 21 wherein said movement effecting means comprises arm means pivotally mounted to said conjointly moving means and secured to the one delivering means for operating it through the different path.

24. The apparatus as set forth in claim 23 wherein said movement effecting means includes means for actuating said arm means from a retracted position toward a pivotally displaced position with respect to said conjointly movable means when said delivering means are in the respective one and another positions thereof so as to effect the movement of the one delivering means through the different path with respect to the other delivering means.

25. The apparatus as set forth in claim 21 further comprising means for carrying a part of the hardenable material in the containing means to a preselected position so as to associate the hardenable material part with the delivering means in the respective one positions thereof.

26. The apparatus as set forth in claim 25 further comprising means associated with said conjointly moving means for lowering the delivering means into association with the hardenable material in said carrying means when the delivering means are in the respective one positions thereof and also into at least close relation with the receiving means of the prime mover when the delivering means are in the respective another positions thereof.

27. The apparatus as set forth in claim 21 further comprising means for carrying a part of the hardenable material in the containing means to a preselected position beyond the remaining hardenable material in the containing means.

28. In an apparatus for delivering a flowable hardenable material from a source thereof to means for receiving it in a component of a prime mover associated in a predetermined assembly position with respect to the apparatus, a method of operating the apparatus comprising the steps of:
(a) displacing a means for carrying a part of the hardenable material from the source to a preselected location with respect thereto and retaining the hardenable material part in the carrying means when it is in its preselected location; and
(b) extracting at least another part of the hardenable material from the first named hardenable material part retained in the carrying means when it is in the preselected location thereof.

29. The method as set forth in claim 28 comprising the additional step of delivering the extracted another part hardenable material part from the preselected location to the receiving means.

30. The method as set forth in claim 29 wherein the delivering step includes depositing the extracted another part of the hardenable material into the receiving means.

31. The method as set forth in claim 28 wherein the carrying means includes a ladle adapted to be immersed at least in part into a level of the hardenable material in the containing means so as to capture in the ladle the first named hardenable material part and wherein the displacing and retaining step comprises moving the ladle with the first named hardenable material part captured therein to the preselected location.

32. The method as set forth in claim 31 wherein the apparatus includes syringe means adapted for extracting and expelling hardenable material and wherein the extracting step comprises immersing at least a part of the syringe means in the first named hardenable material part in the ladle at last upon the movement of the ladle to the preselected location thereof and operating the syringe means to effect the extraction from the ladle of the another hardenable material part into the syringe means.

33. The method as set forth in claim 28 wherein the apparatus includes means adapted for extracting and expelling hardenable material and wherein the extracting step comprises associating the extracting and expelling means and the first named hardenable material part retained in the carrying means at least upon the displacement of the carrying means to the preselected location thereof and operating the extracting and expelling means to effect the extraction thereinto of the at least another hardenable material part.

34. The method as set forth in claim 33 comprising the additional step of disassociating the extracting and expelling means and the remaining first named hardenable material part in the carrying means upon the extraction of the at least another hardenable material part into the extracting and expelling means.

35. The method as set forth in claim 34 comprising the further additional step of translating the extracting and expelling means with the at least another hardenable material part therein to a position at least generally adjacent the receiving means of the prime mover and operating the extracting and expelling means to effect the expulsion therefrom of the at least another hardenable material part into the receiving means of the prime mover.

36. The method as set forth in claim 34 wherein the disassociating step comprises returning the carrying means from the preselected location thereof to the source so as to recharge the carrying means with the hardenable material remaining in the source.

preselected location generally beyond the level of the hardenable material remaining in said containing means;

means operable generally in one position thereof for extracting hardenable material from said carrying means when it is in its preselected location and movable from the one position toward another position at least closely adjacent the at least one receiving means of the prime mover for expelling the extracted hardenable material into the at least one receiving means; and means for selectively effecting the movement of said extracting and expelling means between the one position and the another position thereof.

3. The apparatus as set forth in claim 2 further comprising means for selectively effecting the movement of said carrying means to the preselected position thereof.

4. The apparatus as set forth in claim 2 further comprising means for selectively returning said carrying means from the preselected position thereof to another preselected position generally immersed in the level of the hardenable material remaining in said containing means so as to capture in said carrying means another portion of the hardenable material.

5. The apparatus as set forth in claim 2 further comprising means associated with said containing means for heating the hardenable material therein.

6. The apparatus as set forth in claim 2 further comprising means associated with said extracting and expelling means for selectively effecting the extraction thereinto of the hardenable material from said carrying means and for selectively effecting the expulsion of the extracted hardenable material from said extracting and expelling means into the at least one receiving means.

7. Apparatus for delivering a flowable hardenable material to at least one means for receiving it in a component of a prime mover adapted to be associated in a predetermined assembly position with respect to the apparatus, the apparatus comprising:

a source of the hardenable material;

means movable for displacement between one position generally adjacent said source and another position generally adjacent the prime mover when it is in the predetermined assembly position thereof;

means conjointly movable with said displacement means and operable generally for pivotal movement with respect thereto between an at-rest position to a pivotally displaced position when said displacement means is in the one position and the another position thereof, respectively; and means conjointly movable with said pivotal movement means from the pivotally displaced position to the at-rest position thereof for extracting hardenable material from said source when said displacement means is in the one position thereof and for expelling the extracted hardenable material into the at least one receiving means of the prime mover when said displacement means is in the another position thereof, respectively.

8. The apparatus as set forth in claim 7 further comprising means for selectively driving said displacement means between the one position and the another position thereof.

9. The apparatus as set forth in claim 7 further comprising means for selectively driving said pivotal movement means between the at-rest position and the pivotally displaced position thereof.

10. The apparatus as set forth in claim 7 further comprising means associated with said extracting and expelling means and selectively operable for effecting the extraction into said extracting and expelling means of the hardenable material and the expulsion of the extracted hardenable material from said extracting and expelling means.

11. The apparatus as set forth in claim 7 further comprising means for moving said source to a preselected position so as to present the hardenable material therein to said extracting and expelling means upon the pivotal movement of said extracting and expelling means to its at-rest position when said displacement means is in the one position thereof.

12. The apparatus as set forth in claim 7 further comprising means arranged in supporting engagement with said displacement means and operable generally for moving said displacement means in one of a pair of opposite directions only when said displacement means is in the one position and the another position thereof and said extracting means is in its at-rest position so as to predeterminately dispose said extracting and expelling means with respect to said source and the at least one receiving means of the prime mover, respectively.

13. An apparatus comprising means for containing a level of flowable hardenable material therein, means operable for only carrying a part of the hardenable material at least from the level thereof in said containing means to a preselected position beyond the level of the remaining hardenable material in said containing means so that the entire hardenable material part is contained in said carrying means when it is in its preselected position, and means associated with the entire hardenable material part contained in said carrying means when it is in its preselected position for extracting at least some of the hardenable material from the entire part thereof contained in said carrying means.

14. The apparatus as set forth in claim 13 further comprising means associated with said extracting means for effecting the extraction of the at least some hardenable material from said carrying means into said extracting means when the carrying means is in its preselected position.

15. The apparatus as set forth in claim 13 further comprising means for displacing said extraction means with the at least some hardenable material therein toward another preselected position remote from said containing means and said carrying means.

16. The apparatus as set forth in claim 15 further comprising means associated with said extracting means for effecting the expulsion therefrom of the at least some hardenable material when said extracting means is in the another preselected position thereof.

17. The apparatus as set forth in claim 16 further comprising means for actuating said extracting means in its another preselected position from one attitude thereof to another different attitude in which the at least some hardenable material is expelled from said extracting means.

18. The apparatus as set forth in claim 13 further comprising means for actuating said extraction means from one attitude thereof to another different attitude so as to effect the association of said extraction means with the entire hardenable material part contained in said carrying means when it is in its preselected position.

19. The apparatus as set forth in claim 13 further comprising means for selectively actuating said carrying means to the preselected position thereof.

20. The apparatus as set forth in claim 13 wherein said carrying means comprises a ladle movable with respect to said containing means from a position at least in part immersed into the level of the hardenable material in said containing means so as to capture in said ladle the hardenable material part toward the preselected position with the ladle containing the captured hardenable material part therein.

21. In an apparatus for delivering a flowable hardenable material from means for containing it to a pair of means for receiving it in a component of a prime mover associated in a predetermined position with respect to the apparatus, and a pair of means operable generally for delivering the hardenable material from the containing means to the receiving means pair, respectively; the improvement comprising means for conjointly moving the delivering means pair from one position adjacent the containing means toward another position adjacent the prime mover, respectively, and including means associated with one of the delivering means for effecting movement thereof with respect to the other of the delivering means at least in part through a different path between the respective one and another positions thereof.

22. The apparatus as set forth in claim 21 further comprising means associated with the delivering means and operable for effecting the expulsion therefrom of the hardenable material into the receiving means of the prime mover when said delivering means are in the respective another positions thereof, respectively.

23. The apparatus as set forth in claim 21 wherein said movement effecting means comprises arm means pivotally mounted to said conjointly moving means and secured to the one delivering means for operating it through the different path.

24. The apparatus as set forth in claim 23 wherein said movement effecting means includes means for actuating said arm means from a retracted position toward a pivotally displaced position with respect to said conjointly movable means when said delivering means are in the respective one and another positions thereof so as to effect the movement of the one delivering means through the different path with respect to the other delivering means.

25. The apparatus as set forth in claim 21 further comprising means for carrying a part of the hardenable material in the containing means to a preselected position so as to associate the hardenable material part with the delivering means in the respective one positions thereof.

26. The apparatus as set forth in claim 25 further comprising means associated with said conjointly moving means for lowering the delivering means into association with the hardenable material in said carrying means when the delivering means are in the respective one positions thereof and also into at least close relation with the receiving means of the prime mover when the delivering means are in the respective another positions thereof.

27. The apparatus as set forth in claim 21 further comprising means for carrying a part of the hardenable material in the containing means to a preselected position beyond the remaining hardenable material in the containing means.

28. In an apparatus for delivering a flowable hardenable material from a source thereof to means for receiving it in a component of a prime mover associated in a predetermined assembly position with respect to the apparatus, a method of operating the apparatus comprising the steps of:
(a) displacing a means for carrying a part of the hardenable material from the source to a preselected location with respect thereto and retaining the hardenable material part in the carrying means when it is in its preselected location; and
(b) extracting at least another part of the hardenable material from the first named hardenable material part retained in the carrying means when it is in the preselected location thereof.

29. The method as set forth in claim 28 comprising the additional step of delivering the extracted another part hardenable material part from the preselected location to the receiving means.

30. The method as set forth in claim 29 wherein the delivering step includes depositing the extracted another part of the hardenable material into the receiving means.

31. The method as set forth in claim 28 wherein the carrying means includes a ladle adapted to be immersed at least in part into a level of the hardenable material in the containing means so as to capture in the ladle the first named hardenable material part and wherein the displacing and retaining step comprises moving the ladle with the first named hardenable material part captured therein to the preselected location.

32. The method as set forth in claim 31 wherein the apparatus includes syringe means adapted for extracting and expelling hardenable material and wherein the extracting step comprises immersing at least a part of the syringe means in the first named hardenable material part in the ladle at last upon the movement of the ladle to the preselected location thereof and operating the syringe means to effect the extraction from the ladle of the another hardenable material part into the syringe means.

33. The method as set forth in claim 28 wherein the apparatus includes means adapted for extracting and expelling hardenable material and wherein the extracting step comprises associating the extracting and expelling means and the first named hardenable material part retained in the carrying means at least upon the displacement of the carrying means to the preselected location thereof and operating the extracting and expelling means to effect the extraction thereinto of the at least another hardenable material part.

34. The method as set forth in claim 33 comprising the additional step of disassociating the extracting and expelling means and the remaining first named hardenable material part in the carrying means upon the extraction of the at least another hardenable material part into the extracting and expelling means.

35. The method as set forth in claim 34 comprising the further additional step of translating the extracting and expelling means with the at least another hardenable material part therein to a position at least generally adjacent the receiving means of the prime mover and operating the extracting and expelling means to effect the expulsion therefrom of the at least another hardenable material part into the receiving means of the prime mover.

36. The method as set forth in claim 34 wherein the disassociating step comprises returning the carrying means from the preselected location thereof to the source so as to recharge the carrying means with the hardenable material remaining in the source.

37. The method as set forth in claim 34 wherein the disassociating step comprises actuating the extracting and expelling means with the at least another hardenable material portion therein to a position retracted from the carrying means.

38. The method as set forth in claim 37 comprising the additional step of moving the extracting and expelling means in the retracted position thereof toward another position at least generally adjacent the prime mover and actuating the extracting and expelling means from its retracted position to a protracted position at least generally adjacent the retaining means of the prime mover.

39. The method as set forth in claim 38 comprising the further additional step of operating the extracting and expelling means upon the actuation thereof into its protracted position to effect the expulsion of the at least another hardenable material part from the extracting and expelling means into the retaining means of the prime mover.

40. In an apparatus for delivering a flowable hardenable material from a level thereof in means for containing it to means for receiving it in a component of a prime mover associated in a predetermined assembly position with respect to the apparatus, a method of operating the apparatus comprising the steps of:
 (a) moving a means associated with the containing means for carrying a portion of the hardenable material therein to a preselected location generally beyond the level of the hardenable material remaining in the containing means and immersing at least a part of a syringe means for extracting and expelling hardenable material in the hardenable material portion in the carrying means upon the movement of the carrying means to its preselected location; and
 (b) operating the syringe means to effect the extraction of at least some of the hardenable material from the carrying means in its preselected location into the syringe means.

41. The method as set forth in claim 40 comprising the additional step of displacing the syringe means with the at least some hardenable material therein toward a translated position at least generally adjacent the prime mover.

42. The method as set forth in claim 41 comprising the further additional step of actuating the syringe means to effect the expulsion therefrom of the at least some hardenable material into the receiving means when the syringe means is in the translated position thereof.

43. The method as set forth in claim 41 comprising the further additional step of pivotally rotating the syringe means from a pivotally retracted position into a pivotally protracted position so as to be disposed at least generally adjacent the receiving means of the prime mover upon the displacement of the syringe means to the translated position thereof.

44. The method as set forth in claim 40 wherein the moving and immersing step comprises pivotally rotating the syringe means from a retracted position into a protracted position so as to effect the immersion of the at least part of the syringe means into the hardenable material portion in the carrying means.

45. In an apparatus having a pair of means operable generally for delivering a flowable hardenable material from means for containing the hardenable material to a pair of means in a component of a prime mover for receiving the hardenable material and with the prime mover being associated in a predetermined assembly relation with respect to the apparatus, a method of operating the apparatus comprising: moving conjointly the delivery means pair from one position at least adjacent the containing means to another position at least adjacent the receiving means pair of the prime mover, respectively, and displacing one of the delivering means with respect to the other of the delivering means through a different path between the one and another positions thereof during the conjoint movement of the delivering means pair.

46. The method as set forth in claim 45 wherein the delivering means pair have generally like attitudes in the one and another positions thereof and wherein the moving and displacing step comprises actuating one of the delivering means pivotally with respect to the other delivering means into another attitude different than the like attitudes of the delivering means pair at least during the conjoint movement of the delivering means pair between the one and other positions thereof, respectively, so that the path of the one delivering means differs from that of the other delivering means.

47. The method as set forth in claim 46 wherein the moving and displacing step further comprises returning the one delivering means by pivotally rotating it from its another attitude into its like attitude when the delivering means are in their another positions, respectively.

48. The method as set forth in claim 45 comprising the preliminary step of ingesting a preselected amount of hardenable material into the delivering means pair from another amount of hardenable material associated with the delivering means pair in the one positions thereof, respectively.

49. The method as set forth in claim 48 comprising the additional step of expelling the preselected amount of hardenable material from the delivering means pair in the another position thereof into the receiving means pair, respectively.

50. In an apparatus having syringe means operable generally for delivering a flowable hardenable material from means for containing it to means in a component of a prime mover for receiving the hardenable material and also having the prime mover associated in a predetermined assembly position with the apparatus, a method of operating the apparatus comprising the steps of:
 (a) moving a ladle having hardenable material therein captured from the containing means to a preselected location;
 (b) lowering a part of the syringe means into the captured hardenable material in the ladle and extracting therefrom into the syringe means through the syringe means part a preselected amount of the hardenable material;
 (c) raising the syringe means with the preselected amount of hardenable material therein so as to disassociate the syringe means part from the hardenable material in the ladle;
 (d) translating the syringe means to a position generally adjacent the prime mover; and
 (e) lowering the syringe means until the syringe means part is disposed at least closely adjacent the receiving means of the prime mover and expelling the preselected amount of the hardenable material from the syringe means through the syringe means part into the receiving means.

51. The method as set forth in claim 50 wherein the syringe means has like attitudes during the lower and extracting step and the lowering and expelling step and wherin the translating step includes actuating the syringe means to an attitude different than the like attitudes thereof.

52. In an apparatus for delivering a flowable hardenable material from a source thereof to means for receiving it in a component of a prime mover associated in a predetermined assembly position with respect to the apparatus, the apparatus having a ladle immersable at least in part into a level of the hardenable material in the source so as to capture in the ladle a part of the hardenable material, a method of operating the apparatus comprising the steps of:
  (a) moving the ladle with the captured hardenable material part therein beyond the level of the remaining hardenable material in the source to a preselected location; and
  (b) associating a syringe device and the captured hardenable material part in the ladle at least when the ladle is in the preselected location thereof and operating the syringe device to effect the extraction from the captured hardenable material part in the ladle at least another part of the hardenable material into the syringe device.

53. The method as set forth in claim 52 comprising the additional step of disassociating the syringe device and the remaining captured hardenable material part in the ladle upon the extraction of the at least another hardenable material part into the syringe device.

54. The method as set forth in claim 53 comprising the further additional step of displacing the syringe device toward a position at least adjacent the receiving means of the prime mover and expelling the at least another hardenable material part from the syringe device into the receiving means of the prime mover.

55. The method as set forth in claim 52 wherein the associating and operating step includes pivoting the syringe device from one of a pair of pivotally displaced postions to the other thereof, the syringe device being arranged for its association with the captured hardenable material part in the ladle when the syringe device is in its other pivotally displaced position.

56. The method as set forth in claim 55 comprising the additional step of returning the syringe device from its other pivotally displaced position to the one pivotally displaced position thereof upon the extraction from the captured hardenable material part in the ladle of the at least another hardenable material part into the syringe device.

57. The method as set forth in claim 56 comprising the further additional step of displacing the syringe device in its one pivotally displaced position toward the prime mover and again pivoting the syringe device into the other pivotally displaced position thereof so that the syringe device is disposed at least adjacent the receiving means of the prime mover.

58. The method as set forth in claim 57 comprising the further additional step of expelling the at least another hardenable material part from the syringe device into the receiving means of the prime mover.

* * * * *